(12) United States Patent
Strohband et al.

(10) Patent No.: US 7,245,205 B2
(45) Date of Patent: Jul. 17, 2007

(54) VEHICLE WITH CONTROL FOR THE AUTOMATIC ADJUSTMENT OF THE TRANSPARENCY OF VEHICLE WINDOW PANES

(75) Inventors: Sven Strohband, Mountain View, CA (US); Arne Stoschek, Palo Alto, CA (US); Annegret Matthai, Ingolstadt (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 235 days.

(21) Appl. No.: 11/064,151

(22) Filed: Feb. 23, 2005

(65) Prior Publication Data

US 2005/0231336 A1 Oct. 20, 2005

Related U.S. Application Data

(60) Provisional application No. 60/566,008, filed on Apr. 28, 2004, provisional application No. 60/546,744, filed on Feb. 23, 2004.

(51) Int. Cl.
*B60R 25/10* (2006.01)

(52) U.S. Cl. .................... 340/426.27; 340/426.28; 296/146.1; 428/38

(58) Field of Classification Search ................ 340/602
See application file for complete search history.

(56) References Cited

U.S. PATENT DOCUMENTS

| | | | | |
|---|---|---|---|---|
| 4,749,260 A | * | 6/1988 | Yang et al. ................. 359/275 |
| 5,390,045 A | * | 2/1995 | Bernard, Jr. ................. 359/275 |
| 5,495,224 A | * | 2/1996 | Adar ..................... 340/426.26 |
| 5,781,343 A | * | 7/1998 | Cook ......................... 359/608 |
| 6,039,390 A | * | 3/2000 | Agrawal et al. ............ 296/211 |
| 6,246,505 B1 | * | 6/2001 | Teowee et al. ............. 359/241 |
| 6,301,040 B1 | | 10/2001 | Chakrapani et al. ........ 359/296 |
| 6,443,509 B1 | * | 9/2002 | Levin et al. .................. 293/4 |
| 6,522,446 B2 | | 2/2003 | Saxe .......................... 359/237 |
| 6,597,412 B1 | | 7/2003 | Buzak et al. ................. 349/32 |
| 6,606,185 B2 | | 8/2003 | Saxe .......................... 359/296 |
| 6,674,419 B2 | | 1/2004 | Ilcisin et al. .................. 345/66 |
| 6,795,226 B2 | * | 9/2004 | Agrawal et al. ............ 359/265 |
| 6,897,997 B2 | * | 5/2005 | Malvino ..................... 359/296 |
| 2004/0165251 A1 | * | 8/2004 | Malvino et al. ............ 359/296 |

FOREIGN PATENT DOCUMENTS

| | | |
|---|---|---|
| DE | 10057795 | 5/2002 |
| DE | 10253507 | 5/2004 |
| EP | 0 608 203 B1 | 6/1999 |

\* cited by examiner

*Primary Examiner*—Benjamin C. Lee
*Assistant Examiner*—Eric M. Blount
(74) *Attorney, Agent, or Firm*—Baker Botts L.L.P.

(57) ABSTRACT

The invention concerns a vehicle with a window pane, especially a front window, a rear window, a side window or a roof window, for covering of the internal space of the vehicle. The transparency of the window pane is adjustable, and the vehicle includes a control for automatic adjustment of the transparency of the window pane as a function of an operating state of the vehicle.

64 Claims, 9 Drawing Sheets

VEHICLE WITH CONTROL FOR THE AUTOMATIC ADJUSTMENT OF THE TRANSPARENCY OF VEHICLE WINDOW PANES

RELATED PATENT APPLICATION

This application claims the benefit of U.S. Provisional Application Ser. No. 60/546,744 filed on Feb. 23, 2004, entitled "KRAFTFAHRZEUG" and U.S. Provisional Application Ser. No. 60/566,008 filed on Apr. 28, 2004, entitled "KRAFTFAHRZEUG".

TECHNICAL FIELD OF THE INVENTION

The invention concerns a vehicle with a window pane to cover an internal space of the vehicle, in which transparency of the window pane is adjustable.

BACKGROUND OF THE INVENTION

Window panes with adjustable transparency are known, for example, from U.S. Pat. No. 6,674,419, U.S. Pat. No. 6,597,412, U.S. Pat. No. 6,522,446, U.S. Pat. No. 6,606,185, U.S. Pat. No. 6,301,040, EP 0 608 203 B1, the document BINE 1/02, published by the Technical Information Center Karlsruhe, Gesellschaft für wissenschaftlich-technische Information mbH, as well as the Internet site www.smartglass.com.

Window panes with an adjustable transparency can be obtained, for example, from FLABEG GmbH & Co. KG, Siemensstrasse 3, 90766 Fürth, Germany, or GESIMAT GmbH, Gesellschaft für intelligente Materialien und Technologien, Innovationspark Wuhlheide, Köpenicker Strasse 325, 12555 Berlin, Germany.

The task of the invention is to improve the handling properties of a vehicle.

SUMMARY OF EMBODIMENTS OF THE INVENTION

The aforementioned task is solved by a vehicle with a window pane, especially a front window, a rear window, a side window or a roof window for covering an internal space of the vehicle, in which transparency of the window pane is adjustable, and in which the vehicle includes a control for automatic adjustment of the transparency of the window pane as a function of an operating state of the vehicle.

In one embodiment of the invention, an aforementioned operating state includes solar radiation acting on the window pane. In another embodiment of the invention, control includes a solar radiation module to generate a control signal to adjust the transparency of the window pane as a function of an output signal of a sensor to measure the solar radiation acting on the window pane.

In another embodiment of the invention, an aforementioned operating state includes an output signal of a rain sensor to measure rain acting on the vehicle. In another embodiment of the invention, the control includes a rain module to generate a control signal to adjust the transparency, especially highest transparency, of the window pane as a function of the output signal of the rain sensor.

In another embodiment of the invention, an aforementioned operating state includes an amount of light present outside of the vehicle. In another embodiment of the invention, the control includes an outside light module to generate a control signal to adjust the transparency of the window pane as a function of an output signal of a light sensor to measure the light amount present outside of the vehicle.

In another embodiment of the invention, an aforementioned operating state includes a switching state of a fog lamp. In another embodiment of the invention, the control includes a fog module to generate a control signal to adjust the transparency, especially highest transparency, of the window pane as a function of the switching state of the fog lamp.

In another embodiment of the invention, an aforementioned operating state includes a state of an air conditioner. In another embodiment of the invention, the control includes a temperature management module to generate a control signal to adjust the transparency of the window pane as a function of the state of the air conditioner.

In another embodiment of the invention, an aforementioned operating state includes a state of a door lock. In another embodiment of the invention, the control includes a closure module to generate a control signal to adjust the transparency of the window pane as a function of the state of the door lock.

In another embodiment of the invention, an aforementioned operating state includes an engaged gear of a transmission. In another embodiment of the invention, the control includes a reverse module to generate a control signal to adjust the transparency of the window pane, especially a rear window, rear side window or all side windows, as a function of whether a reverse gear has been engaged. If the reverse gear is replaced by another gear, it can be prescribed that the window pane again assumes its previous state.

In another embodiment of the invention, an aforementioned operating state includes the occurrence of an accident. In another embodiment of the invention, the control includes an accident management module to generate a control signal to adjust the highest transparency of the window pane on recognition of an accident.

In another embodiment of the invention, an aforementioned operating state includes the geographic location of the vehicle. In another embodiment of the invention, the control includes a location module to generate a control signal to adjust the transparency of the window pane as a function of the legal requirements prevailing in the geographic location of the vehicle.

In another embodiment of the invention, an aforementioned operating state includes an occupancy of the internal space of the vehicle. In another embodiment of the invention, the control includes an occupancy module to generate a control signal to adjust the transparency of the window pane as a function of the occupancy of the internal space of the vehicle.

In another embodiment of the invention, the control includes a conflict management module to generate a control signal to adjust the transparency of the window pane as a function of at least two operating states, especially as a function of a first control signal to generate the transparency of the window pane as a function of the first operating state, and at least a second control signal to adjust the transparency of the window pane as a function of a second operating state.

In another embodiment of the invention, the window pane includes a PALC layer and/or an SPD layer. The window pane, in particular, includes a SPD layer arranged on a PALC layer. In another embodiment of the invention, a PVB layer or a PU layer is arranged between the PALC layer and the SPD layer. In addition, a PVB layer can also be arranged on a side of the SPD layer facing away from the PALC layer and/or a PVB layer can be arranged on a side of the PALC layer facing away from the SPD layer.

A PALC layer, depending on the applied voltage, can assume a state, in which it is transparent, and assume a state, in which it is opaque. Appropriate PALC layers are disclosed in U.S. Pat. No. 6,674,419 (incorporated by reference) and U.S. Pat. No. 6,597,412 (incorporated by reference). PALC layers according to the claims are supposed to be PALC layers in the strict sense, as disclosed in U.S. Pat. No. 6,674,419 and U.S. Pat. No. 6,597,412. PALC layers according to the claims, however, can also be similar layers. PALC layers according to the claims can also generally be layers that, depending on applied voltage, especially by orthogonal polarization of light, can assume a state, in which they are transparent, and can assume a state, in which they are opaque.

An SPD layer can assume a shading of different intensity, depending on the level of an applied voltage. Appropriate SPD layers are disclosed in U.S. Pat. No. 6,522,446 (incorporated by reference), U.S. Pat. No. 6,606,185 (incorporated by reference) and U.S. Pat. No. 6,301,040 (incorporated by reference). SPD layers according to the claims are supposed to be especially SPD layers in the strict sense, as disclosed in U.S. Pat. No. 652446, U.S. Pat. No. 6,606,185 and U.S. Pat. No. 6,301,040. SPD layers according to the claims, however, can also be similar layers. SPD layers according to the claims can also generally be layers that can assume a shading of different intensity, as a function of the level of an applied voltage.

In another embodiment of the invention, the vehicle includes a transparency sensor to measure the transparency of the window pane and a calibration device for automatic changing of a control signal generated by the control, as a function of an output signal of the transparency sensor.

In another embodiment of the invention, the vehicle also includes a voltage converter, connected mechanically to the window pane, for conversion of the voltage of a control signal that can be generated by the control to adjust the transparency of the window pane. In another embodiment of the invention, the window pane can be moved up and down. Appropriate voltage converters are available, for example, from Endicott Research Group, Inc., 2601 Wayne St., Endicott N.Y. 13760, USA. A particularly suitable voltage converter is the LSP 12-3-14 H voltage converter of Endicott Research Group, Inc. The LSP 12-3-14 H voltage converter converts a 12 V DC voltage to a 120 V AC voltage.

The aforementioned task is also solved by a vehicle with a window pane, especially a front window, a rear window, a side window or a roof window for covering an internal space of the vehicle, in which transparency of the window pane is adjustable as a function of a control signal, and in which the vehicle also includes a control to generate the control signal, transparency to measure the transparency of the window pane and a calibration device for automatic changing of the control signal as a function of an output signal of the transparency signal.

In another embodiment of the invention, the window pane includes a PALC layer and/or an SPD layer. The window pane, in particular, includes an SPD layer arranged on a PALC layer. In another embodiment of the invention, a PVB layer or a PU layer is arranged between the PALC layer and the SPD layer. In addition, a PVB layer can be arranged on the side of the SPD layer facing away from the PALC layer and/or a PVB layer can be arranged on a side of the PALC layer facing away from the SPD layer.

In another embodiment of the invention, the vehicle also includes a voltage converter, mechanically connected to the window pane, for conversion of the voltage of the control signal for adjustment of the transparency of the window pane. In another embodiment of the invention, the window pane can be moved up and down.

The aforementioned task is also solved by an armored vehicle with a bullet-proof window pane, especially a bullet-proof rear window or a bullet-proof side window, for covering an internal space of an armored vehicle, in which transparency of the bullet-proof window pane is adjustable, and in which the armored vehicle has a vibration sensor to record a vibration acting on the armored vehicle and/or the bullet-proof window pane and a control for automatic adjustment of the transparency of the bullet-proof window pane as a function of an output signal of the vibration sensor. The window panes in the rear part of the armored vehicle are advantageously adjusted according to the lowest transparency, especially opaque, when the control recognizes a vibration that would be suitable to destroy an ordinary window pane of a vehicle. Such vibration, for example, can be the striking of a bullet or a heavy impact.

In another embodiment of the invention, the window pane includes a PALC layer and/or an SPD layer. The window pane, in particular, includes an SPD layer arranged on a PALC layer. In another embodiment of the invention, the PVB layer or PU layer is arranged between the PALC layer and the SPD layer. In addition, the PBV layer can be arranged on the side of the SPD layer facing away from the PALC layer and/or a PBV layer can be arranged on the side of the PALC layer facing away from the SPD layer.

In another embodiment of the invention, the vehicle also includes a voltage converter, connected mechanically to the window pane, for conversion of the voltage of a control signal for adjustment of the PALC layer. In another embodiment of the invention, the window pane can be moved up and down.

In another embodiment of the invention, the vehicle also includes a voltage converter, mechanically connected to the window pane, for conversion of the voltage of a control signal for adjustment of the SPD layer. In another embodiment of the invention, the window pane can be moved up and down.

The aforementioned task is also solved by a vehicle with a window pane, especially a front window, a rear window, a side window or a roof window, for covering an internal space of the vehicle, in which the window pane has a PALC layer and an SPD layer arranged on the PALC layer. In one embodiment of the invention, the PVB layer or PU layer is arranged between the PALC and the SPD layer. In addition, a PVB layer can be arranged on the side of the SPD layer facing away from the PALC layer and/or a PVB layer can be arranged on the side of the PALC layer facing away from the SPD layer.

The aforementioned task is also solved by a window pane, especially a front window, a rear window, a side window or a roof vehicle, for a vehicle with a PALC layer and an SPD layer. arranged on the PALC layer. In one embodiment of the invention, a PVB layer or a PU layer is arranged between the PALC layer and the SPD layer. In addition, a PVB layer can be arranged on the side of the SPD layer facing away from the PALC layer and/or a PVB layer can be arranged on the side of the PALC layer facing away from the SPD layer.

An improved vehicle relative to known vehicles includes, for example, a window pane that can be moved up and down to cover an internal space of the vehicle, in which transparency of the window pane is adjustable, and a voltage converter, mechanically connected to the window pane, to convert the voltage of a control signal for adjustment of the transparency of the window pane. Appropriate voltage converters can be obtained, for example, from Endicott Research Group, Inc., 2601 Wayne St., Endicott N.Y. 13760, USA. A particularly suitable voltage converter is the LSP 12-3-14 H voltage converter of Endicott Research Group, Inc. The LSP 12-3-14 H voltage converter converts a 12 V DC voltage to a 120 V AC voltage.

The vehicle according to the invention is especially a ground vehicle, usable individually in traffic. Vehicles according to the invention are not restricted, in particular, to ground vehicles with an internal combustion engine.

Additional advantages and details are apparent from the following description of practical examples.

DETAILED DESCRIPTION OF EMBODIMENTS
OF THE INVENTION

Figure 1:
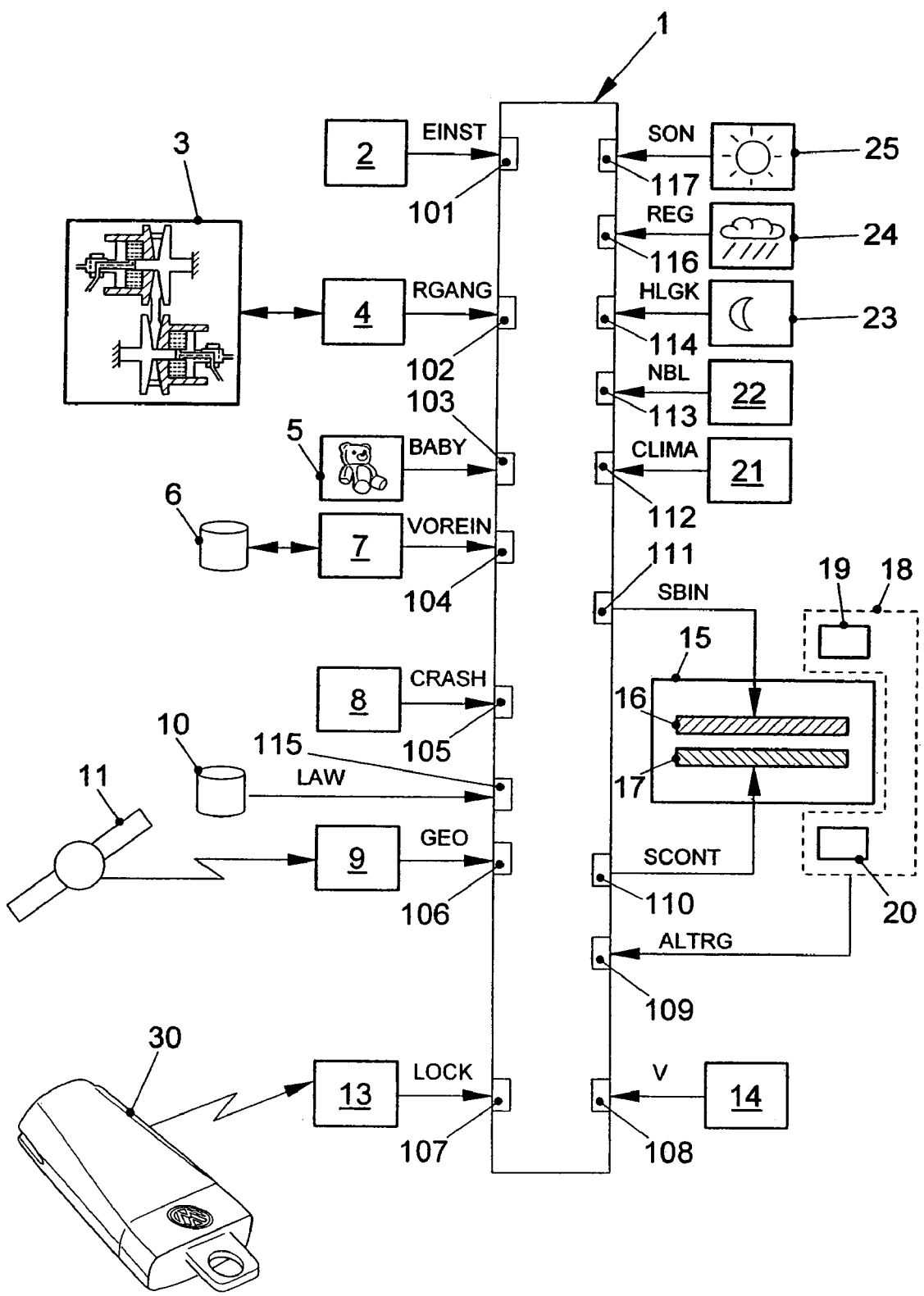
FIG. 1 shows a practical example of a control for automatic adjustment of a transparency of a window pane of a vehicle as a function of an operating state of the vehicle.
Figure 2:
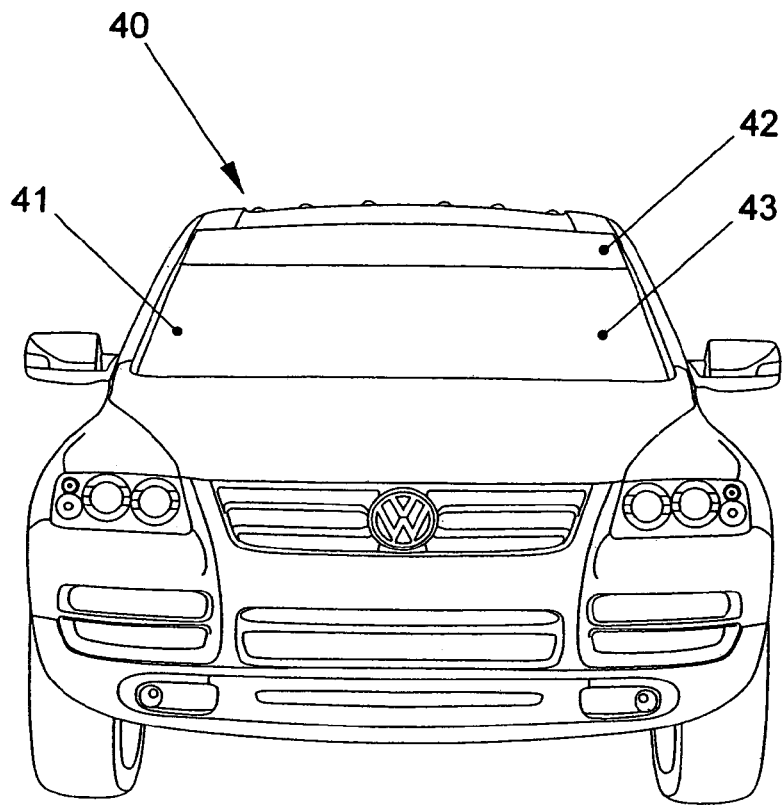
FIG. 2 shows a practical example of a vehicle in a front view.
Figure 3:
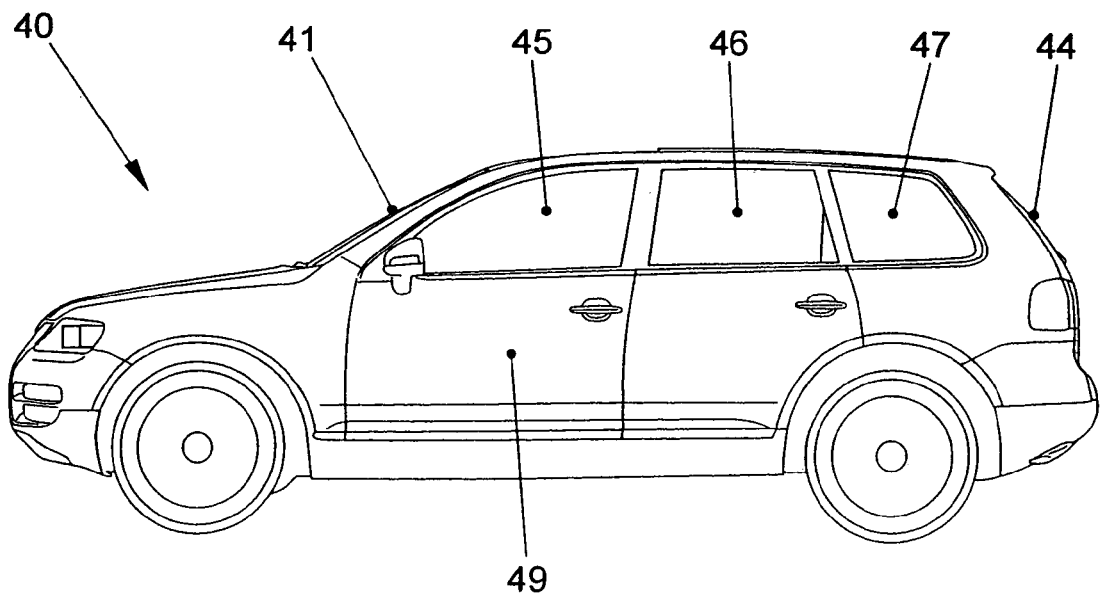
FIG. 3 shows a practical example of a vehicle in a side view.
Figure 4:
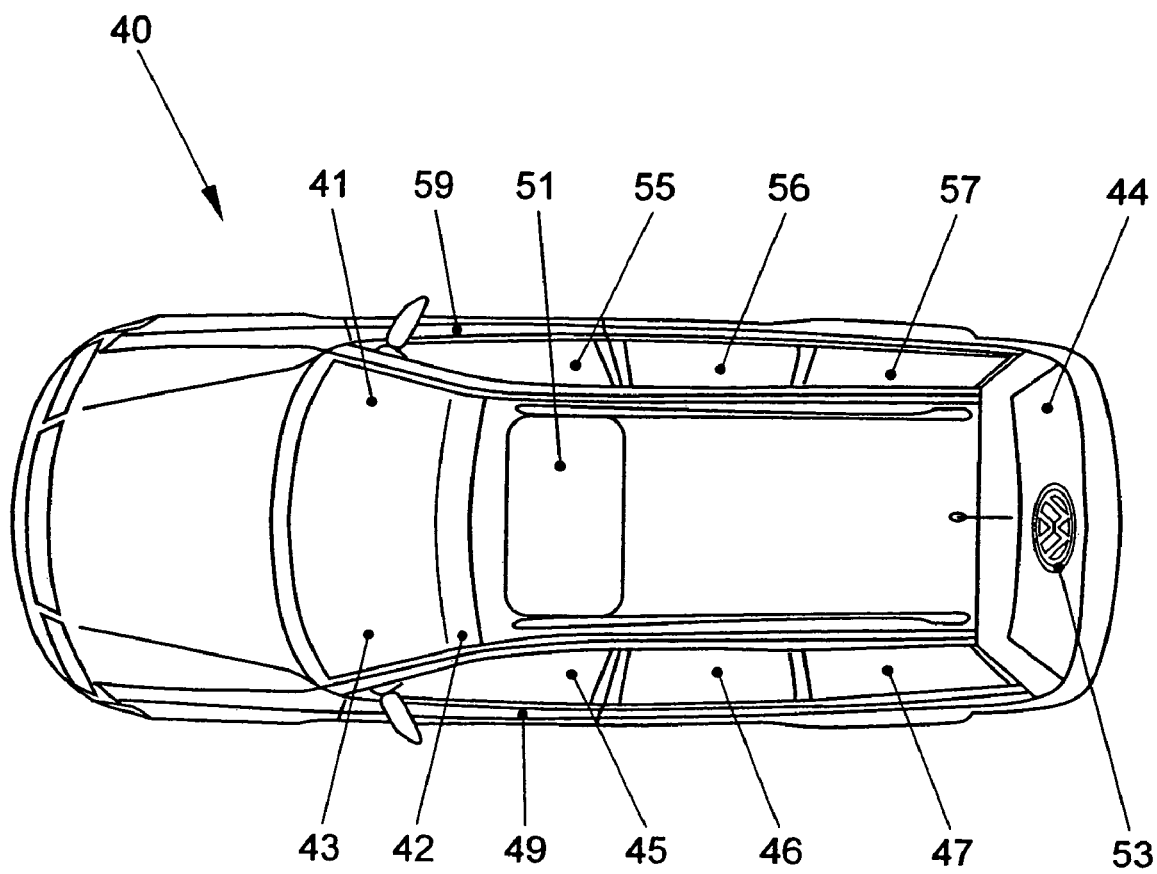
FIG. 4 shows a practical example of a vehicle in a top view.

FIG. 1 shows a practical example of a control 1 for automatic adjustment of a transparency of a window pane 15 of a vehicle 40, shown in a front view in FIG. 2, in a side view in FIG. 3 and in a top view in FIG. 4, depending on the operating state of vehicle 40. It can then be prescribed that the window pane 15 according to FIG. 1 correspond to the front window 41 of the vehicle 40, a part of the front window 41 of vehicle 40, for example, the upper part 42 of the front window 41 of vehicle 40, and/or the lower part 43 of the front window 41 of vehicle 40, a front side window 45 and 55 of vehicle 40 arranged in a door 49 or 59, a middle side window 46 or 56 of the vehicle 40, a rear side window 47 or 57 of vehicle 40, the rear window 44 of vehicle 40 and/or the roof window 51.

The window pane 15 can include a PALC layer 16 and/or an SPD layer 17. The PALC layer 16, depending on a voltage applied by an electrode, described with reference to FIG. 6, can assume a state, in which it is transparent, and a state, in which it is opaque. Appropriate PALC layers are disclosed in U.S. Pat. No. 6,674,419 (incorporated by reference), and U.S. Pat. No. 6,597,412 (incorporated by reference). The SPD layer 17, depending on the level of the voltage applied by the electrodes, described with reference to FIG. 7, can assume a shading of different intensity. Appropriate SPD layers are disclosed in U.S. Pat. No. 6,522,446 (incorporated by reference), U.S. Pat. No. 6,606,185 (incorporated by reference) and U.S. Pat. No. 6,301,040 (incorporated by reference).

Figure 5:
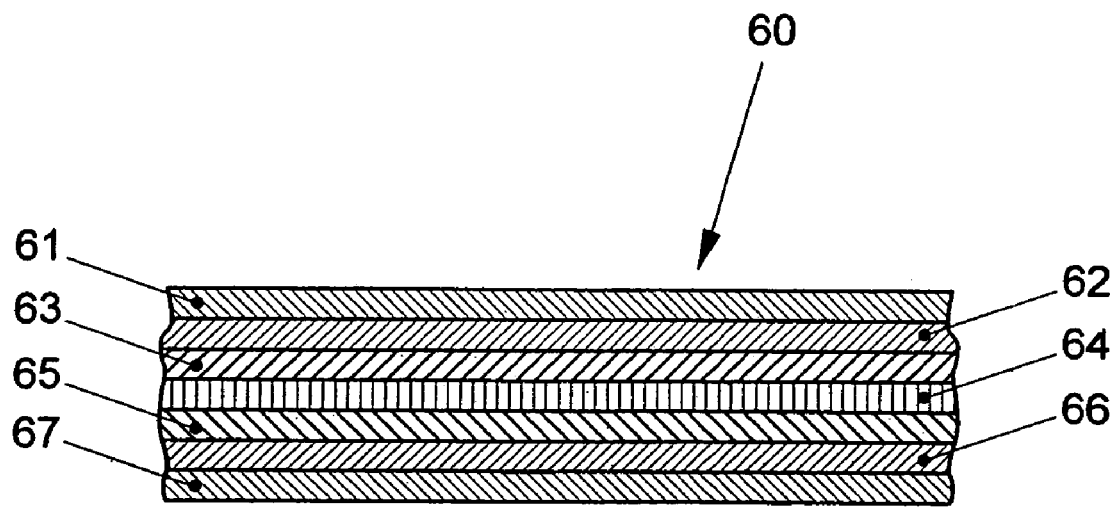
FIG. 5 shows a practical example of a window pane of a vehicle.

FIG. 5 shows a cross section of a window pane 60 as a preferred practical example of the window pane 15 according to FIG. 1, in which reference number 63 denotes a PALC layer and reference number 65 a SPD layer. A layer 64 of PVB of PU is arranged between the PALC layer 63 and the SPD layer 65. A PVB layer 62 is arranged on a side of the PALC layer 63 facing away from the SPD layer 65. A glass layer 61 is also arranged on a side of the PVB layer 62 facing away from PALC layer 62. In addition, the PVB layer 66 is arranged on a side of the SPD layer 65 facing away from the PALC layer 63. A glass layer 67 is again arranged on a side of the PVB layer 66 facing away from the SPD layer 65.

Figure 6:
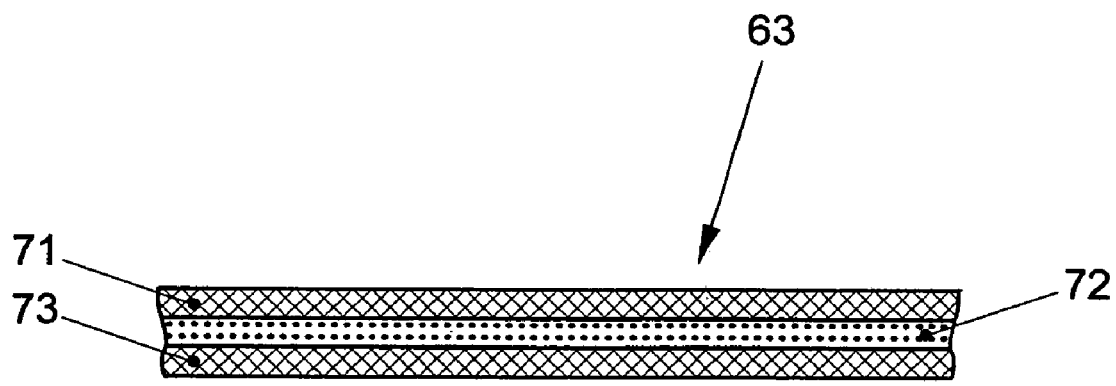
FIG. 6 shows a practical example of a PALC layer of a window pane of a vehicle.
Figure 7:
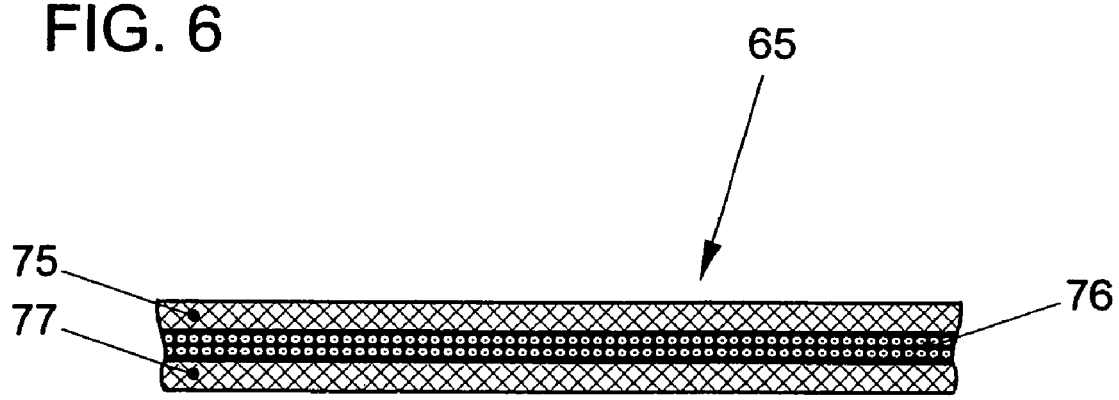
FIG. 7 shows a practical example of an SPD layer of a window pane of a vehicle.

The PALC layer 63, as shown in FIG. 6 by means of a cross section through the PALC layer 63, has a PALC film 72 arranged between two electrodes 71 and 73. The SPD layer 65, as shown in FIG. 7 by means of a cross section through the SPD layer 65, has an SPD film 76 arranged between two electrodes 75 and 77.

The operating state, mentioned with reference to FIG. 1, can be solar radiation acting on the window pane 15, an amount of light present outside of vehicle 40, a condition of an air conditioner 21 arranged in vehicle 40, a state of a door lock 13 for opening of a door of the vehicle 40 by means of a key, denoted with reference number 30, the geographic location of the vehicle 40 and/or an occupancy of the internal space of the vehicle.

The vehicle 40 has a sunlight sensor 25 allocated to the window pane 15 to measure the solar radiation acting on window pane 15 and to produce a corresponding sunlight signal SON that is read by control 1 via an interface 117. The vehicle 40 also has a rain sensor 24 to measure rain acting on the vehicle. The rain acting on the vehicle or a corresponding output signal RGN of the rain sensor 24 can be an operating state mentioned with reference to FIG. 1. The output signal RGN of the rain sensor is ready by the control 1 via an interface 116. The vehicle 40 also has a light sensor 23 to measure an amount of light present outside of the vehicle 40 and to produce an output signal HLGK, representing the amount of light present outside of vehicle 40. The output signal HLGK of the light sensor 23 is read by the control 1 via an interface 114. The vehicle 40 also has a fog lamp 22. The switching state NBL, i.e., on or off, is read by a control 1 via an interface 113. The switching state NBL of the fog lamp 22 can also be understood as the operating state mentioned with reference to FIG. 1.

A signal CLIMA, representing the state of the air conditioner 21 arranged in the vehicle 40, can also be read by the control 1 via an interface 112. This signal CLIMA can denote, for example, the amount of heat to be supplied or removed.

In addition, a signal lock, representing the state of the door lock 13 for opening of a door of the vehicle 40 by means of a key 30, can also be read by control 1 via an interface 107.

The vehicle 40 has a navigation system 9, for example, supported on satellite 11, to determine the geographic location GEO of the vehicle 40, which is read by the control 1 via an interface 106. In addition, a database 10 is provided, whose information LAW can be read by the control 1 via an interface 115. This information LAW pertains to legal provisions in the individual locations, for example, US states, concerning transparency or shading of windows of vehicle.

In this function, a user-interactive alternative can also be provided, in which an operator of the vehicle is asked whether he wishes to perform an adjustment of the determined new regulations, and then only makes an automatic adjustment if it is operated by the operator.

The vehicle 40 also has a sensor device 8 to recognize an accident and to produce a corresponding output signal CRASH that can be read by the control 1 via an interface 105. The occurrence or non-occurrence of an accident can also be an operating state mentioned in the introduction.

The vehicle 40 also has a person recognition 7 to recognize a person in the vehicle 40 or its occupancy. This person recognition 7 can be used, for example, for seat preadjustment. For this purpose, the person recognition 7 resorts to data stored in a database 6. Information VOREIN conveyed from the person recognition by control 1 for preadjustment of the window pane 15 can be read according to a recognized person via an interface 104. If the preadjustment of window pane 15 is changed to the recognized person, the control 1 can transmit this to person recognition 7.

The vehicle 40 also has a small child recognition 5, implemented, for example, as a camera and/or pressure sensor, to produce a signal BABY, indicating occupancy of a seat by a small child, which can be read by control 1 via an interface 103. An aforementioned pressure sensor can be obtained, for example, from the company IEE International Electronics & Engineering S.A., Zone Industrielle. - FINDEL, 2b, route de Trèves, L-2632 Luxembourg, Luxembourg.

The vehicle 40 also has a transmission control 4 to control a transmission 3. An engaged gear of the transmission 3 can be an operating state mentioned in the introduction. From the transmission control 4, the control 1 receives a signal RGANG via an interface 102, which states whether a reverse gear is engaged or not.

The vehicle 40 also has a transparency sensor 18 with an LED 19 and a photodiode 20 to measure the transparency of the window pane 15. A transparency sensor 18 produces an output signal ALTRG concerning the transparency of window pane 15, which can be read by control 1 via an interface 109.

In addition, an entry device 2 for manual adjustment of the transparency of the window pane 15 is provided by means of a signal EINST, which can be read by the control 1 via an interface 101. A speed v of the vehicle 40, furnished by a control 14, can be read by control 1 via interface 108. This input device can include, for example, an input device arranged in a center console for (separate) adjustment of the transparency of all window panes adjustable in terms of transparency. The input device 2 can also, or as an alternative, include an input device arranged in the rear region to adjustment transparency of a rear side window 46 or 56. The input device 2 can also, or as an alternative, have an input device to adjust specific (selectable) combinations and preadjustments of transparency of window panes adjustable in terms of transparency.

It can be prescribed that the vehicle 40 has only part of the aforementioned components 2, 4, 5, 7, 8, 9, 13, 14, 20, 21, 22, 23, 24 and 25 to produce signals for control 1. Depending on the signals of these components 2, 4, 5, 7, 8, 9, 13, 14, 20, 21, 22, 23, 24 and 25 or part of these components 2, 4, 5, 7, 8, 9, 13, 14, 20, 21, 22, 23, 24 and 25, the control 1 determines the control signals SBIN and SCONT to control the PALC layer 16 or the SPD layer 17 and issues the signals via corresponding interfaces 110 and 111.

The control signal SBIN can have the following format:

$$SBIN = \begin{bmatrix} SIDELEFTFRONT\_BIN \\ SIDELEFTPASS\_BIN \\ SIDELEFTTRK\_BIN \\ SIDERIGHTFRONT\_BIN \\ SIDERIGHTPASS\_BIN \\ SIDERIGHTTRK\_BIN \\ FRONTOT\_BIN \\ FRONTUT\_BIN \\ REAR\_BIN \\ ROOF\_FIN \end{bmatrix}$$

If provided, SIDELEFTFRONT_BIN is a binary (ON/OFF) control signal to control a PALC layer in the left front side window 45, SIDELEFTPASS_BIN is a binary (ON/OFF) control signal to control a PALC layer in the left middle side layer 46, SIDELEFTTRK_BIN is a binary (ON/OFF) control signal to control a PALC layer in the left rear side window 47, SIDERIGHT FRONT_BIN is a binary (ON/OFF) control signal to control a PALC layer in the right front side window 55, SIDERIGHTPASS_BIN is a binary (ON/OFF) control signal to control a PALC layer in the right middle side window 56, SIDERIGHTTRK_BIN is a binary (ON/OFF) control signal to control a PALC layer in the right rear side window 57, FRONTOT_BIN is a binary (ON/OFF) control signal to control a PALC layer in the upper part 42 of the front window 41, FRONTOT_BIN is a binary (ON/OFF) control signal to control a PALC layer in the lower part 43 of the front window 41, REAR_BIN is a binary (ON/OFF) control signal to control a PALC layer in the rear window 44 and ROOF_BIN is a binary (ON/OFF) control signal to control a PALC layer in the roof window 51.

The control signal SCONT can have the following format:

$$SCONT = \begin{bmatrix} SIDELEFTFRONT\_CONT \\ SIDELEFTPASS\_CONT \\ SIDELEFTTRK\_CONT \\ SIDERIGHTFRONT\_CONT \\ SIDERIGHTPASS\_CONT \\ SIDERIGHTTRK\_CONT \\ FRONTOT\_CONT \\ FRONTUT\_CONT \\ REAR\_CONT \\ ROOF\_CONT \end{bmatrix}$$

If provided, SIDELEFTFRONT_CONT is a control signal to control an SPD layer in the left front side window 45, SIDELEFTPASS_CONT is a control signal to control an SPD layer in the left middle side window 46, SIDELEFTTRK_CONT is a control signal to control an SPD layer in the left rear side window 47, SIDERIGTHFRONT_CONT is a control signal to control an SPD layer in the right front side window 55, SIDERIGHTPASS_CONT is a control signal to control an SPD layer in the right middle side window 56, SIDERIGHTTRK_CONT is a control signal to control an SPD layer in the right rear side window 57, FRONTOT_CONT is a control signal to control an SPD layer in the upper part 42 of the front window 51, FRONTUT_CONT is a control signal to control an SPD layer in the lower part 43 of the front window 41, REAR_CONT is a control signal to control an SPD layer in the rear window 44 and ROOF_CONT is a control signal to control an SPD layer in the roof window 51.

The interfaces 101, 102, 103, 104, 105, 106, 107, 108, 109, 110, 111, 112, 113, 114, 115, 116 and 117 can be different hardware interfaces or merely software interfaces of a bus system.

Figure 8:
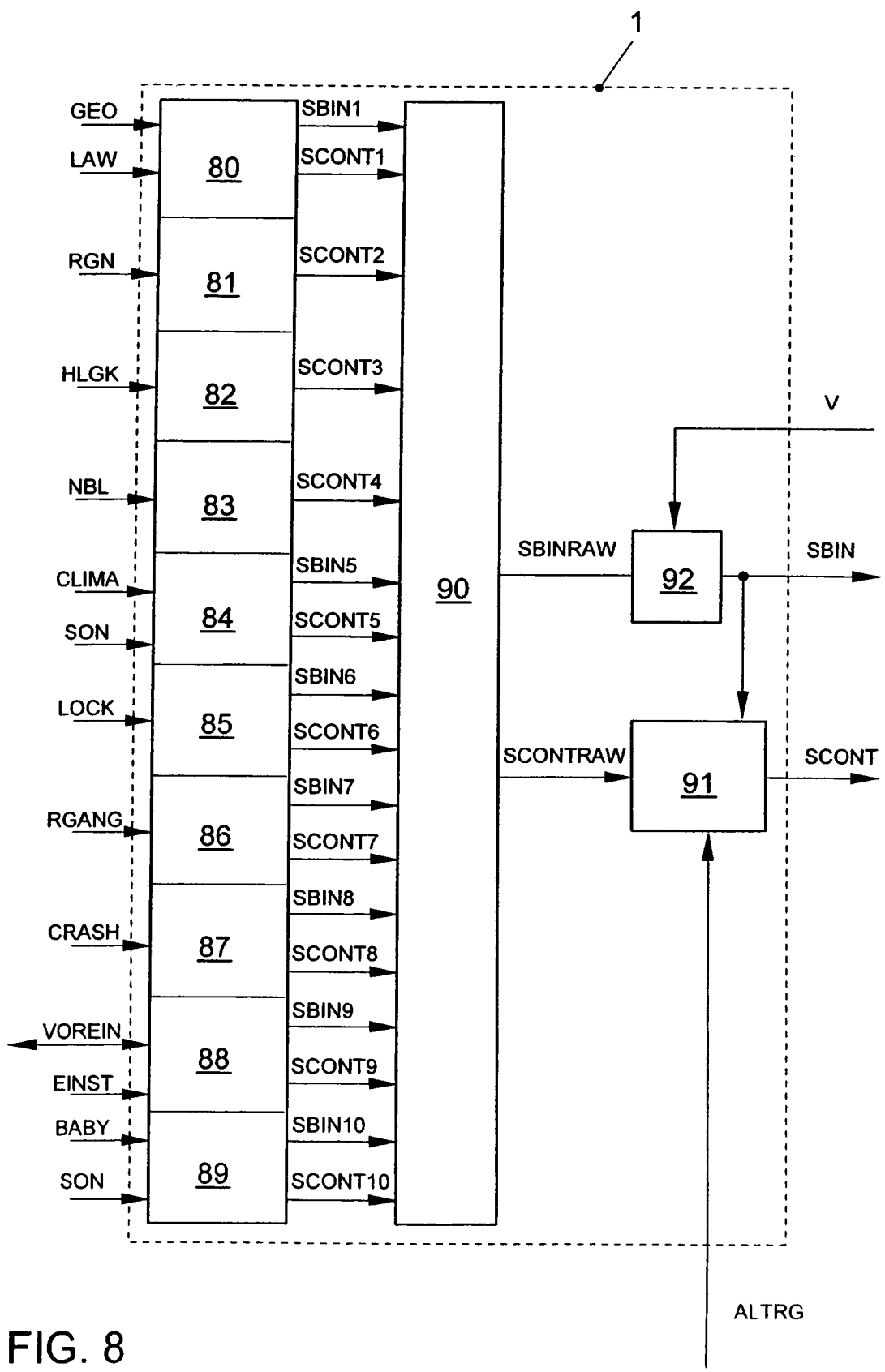
FIG. 8 shows a detail view of a control for automatic adjustment of the transparency of a window pane of a vehicle as a function of an operating state of the vehicle.

FIG. 8 shows a detail view of the control 1. Control 1 includes a location module 80 to produce a control signal SBIN1 and a control signal SCONT1 to adjust the transparency of window panes 41, 44, 45, 46, 47, 51, 55, 56, 57 as a function of legal provisions prevailing in the geographic location GEO of the vehicle 40 (transmitted as LAW information). The control signals SBIN1 and SCONT1 then form proposals of the location module 80 for the control signals as SBIN and SCONT. The control signal SBIN1 the corresponds in its format to the control signal SBIN, in which, however, the binary statement ON or OFF is expanded by the possibility "no information".

The control signal SCONT1 has the following format:

$$SCONT = \begin{bmatrix} SIDELEFTFRONT\_CONT \\ SIDELEFTPASS\_CONT \\ SIDELEFTTRK\_CONT \\ SIDERIGHTFRONT\_CONT \\ SIDERIGHTPASS\_CONT \\ SIDERIGHTTRK\_CONT \\ FRONTOT\_CONT \\ FRONTUT\_CONT \\ REAR\_CONT \\ ROOF\_CONT \end{bmatrix}$$

The format of the first column of SCONT1 corresponds to the format of SCONT, but in which the continuous control signal is expanded by the possibility "no information". In addition, another column is provided with a variable OP, which can assume =, <, >, <, > or "no information", and states how one line of SCONT is related to the corresponding line of SCONT1. Thus, < in a line means that the value of SCONT in this line should be smaller than the value of SCONT1 stated in this line.

Control 1 also includes a rain module 81 to generate a control signal SCONT2 to adjust the transparency of window panes 41, 44, 45, 46, 47, 51, 55, 56, 57 as a function of the output signal RGN of the rain sensor 24, an outside light module 82 to generate a control signal SCONT3 to adjust the transparency of window panes 41, 44, 45, 46, 47, 51, 55, 56, 57 as a function of an output signal HLGK of light sensor 23, and a fog module 83 to generate a control signal SCONT4 to adjust the transparency of the window panes 41, 44, 45, 46, 47, 51, 55, 56, 57 as a function of the switching state NBL of the fog lamp 22. During fog, rain and diminishing brightness outside of the vehicle, the transparency of the window panes 41, 44, 45, 46, 47, 51, 55, 56, 57 is then increased to its maximum value.

The control 1 also includes a temperature management module 84 to generate a control signal SBIN5 and a control signal SCONT5 to adjust the transparency of the window panes 44, 46, 47, 51, 56, 57 as a function of the signal CLIMA, representing the state of the air conditioner 21 arranged in the vehicle 40, and optionally the signal SON. During strong cooling the transparency is then reduced and during strong heating with the presence of solar radiation, the transparency of the window panes 44, 46, 47, 51, 56, 57 is increased.

Control 1 also contains a closure module 85 to produce a control signal SBIN6 and a control signal SCONT6 to adjust the lowest transparency of all window panes 41, 44, 45, 46, 47, 51, 55, 56, 57, when the signal LOCK indicates closure of the vehicle. In addition, it can be prescribed that the control signal SBIN6 and/or SCONT6 are produced as a blinking behind the highest and lowest transparency, in order to confirm to a user entry (opening or closing) by means of key 30. In addition, it can be prescribed that the control signal SBIN6 and/or SCONT6 are produced as strip-by-strip diminishing transparency during unlocking and/or strip-by-strip increasing transparency during locking.

The control 1 also includes a reverse module 86 to produce a control signal SBIN7 and control signal SCONT7 to adjust the lowest transparency of the rear window 44, when the signal RGANG indicates that a reverse gear is engaged.

The control 1 includes an accident module 87 to produce a control signal SBIN8 and a control signal SCONT8 to adjust the highest transparency of all window panes 41, 44, 45, 46, 47, 51, 55, 56, 57, when the signal CRASH indicates that an accident has occurred.

The control 1 includes a pre-adjustment module 88 to produce a control signal SBIN9 and a control signal SCONT9 to adjust the transparency of the window panes 41, 44, 45, 46, 47, 51, 55, 56, 57 according to the information VOREIN for pre-adjustment of the window panes 41, 44, 45, 46, 47, 51, 55, 56, 57 corresponding to a recognized person. If the preadjustment of a window pane 41, 44, 45, 46, 47, 51, 55, 56, 57 for a recognized person is changed, for example, by manual adjustment of the transparency of the window panes 41, 44, 45, 46, 47, 51, 55, 56 or 57 by means of the signal EINST, the preadjustment module 88 issues the corresponding information VOREIN.

The control 1 includes a solar radiation module 88 to produce a control signal SBIN10 and a control signal SCONT10 to adjust the transparency of a window pane 41, 44, 45, 46, 47, 51, 55, 56 or 57 affected by stronger solar radiation, as a function of the output signal SON of the sunlight sensor 25 to measure the solar radiation acting on the corresponding window pane 41, 44, 45, 46, 47, 51, 55, 56 and 57, and a signal BABY, indicating occupation of a seat in the region of the corresponding window pane 41, 44, 45, 46, 47, 51, 55, 56 or 57 by a small child. The transparency during solar radiation is then reduced, by only conditionally in the lower part 43 of the front window 41. In addition, it is prescribed that the lower part does not become opaque (caused by the control signal SBIN10). In addition, the transparency during solar radiation and recognition of a small child is reduced more strongly.

The control has a conflict management module 90 to produce a control signal SBINRAW as a function of the control signal SBIN1, SBIN5, SBIN6, SBIN7, SBIN8, SBIN9 and SBIN10, and a control signal SCONTRAW as a function of the control signals SCONT1, SCONT2, SCONT3, SCONT4, SCONT5, SCONT6, SCONT7, SCONT8, SCONT9 and SCONT10. The control signal SBINRAW corresponds in its format to control signal SBIN. The SCONT SCONTRAW corresponds in its format to the control signal SCONT.

The lines of the control signal SBINRAW correspond to the corresponding lines of the control signal SBIN1, SBIN5, SBIN6, SBIN7, SBIN8, SBIN9 and SBIN10. If a line for all control signal SBIN1, SBIN5, SBIN6, SBIN7, SBIN8, SBIN9 and SBIN10 is occupied with "no information", the corresponding line in SBINRAW receives the value "ONE", i.e., not opaque. If the individual lines of the control signal SBIN1, SBIN5, SBIN6, SBIN7, SBIN8, SBIN9 and SBIN10 are contradictory, the control signal SBIN1, SBIN5, SBIN6, SBIN7, SBIN8, SBIN9 and SBIN10 with the highest priority applies, in which SBIN8 has the highest and SBIN6 the second highest priority. The priority of SBIN10 can be dependent on the signal BABY. The same priorities can also be stipulated for some of the control signals SBIN1, SBIN5, SBIN6, SBIN7 or SBIN9 and the corresponding priority decided on as a function of situation or randomly.

The lines of the control signal SBINRAW correspond to the corresponding lines of the control signal SCONT1, SCONT2, SCONT3, SCONT4, SCONT5, SCONT6, SCONT7, SCONT8, SCONT9 and SCONT10. If one line for all control signals SCONT1, SCONT2, SCONT3, SCONT4, SCONT5, SCONT6, SCONT7, SCONT8, SCONT9 and SCONT10 is occupied with "no information", the corresponding line is to be adjusted in the direction of largest transparency. If the individual lines of the control signal SCONT1, SCONT2, SCONT3, SCONT4, SCONT5, SCONT6, SCONT7, SCONT8, SCONT9 and SCONT10 or contradictory, the control signal SCONT1, SCONT2, SCONT3, SCONT4, SCONT5, SCONT6, SCONT7, SCONT8, SCONT9 or SCONT10 with the highest priority applies, in which SCONT8 has the highest priority. The priority of SCONT10 can be dependent on the signal BABY. If a line remains undefined based on the variables OP with <, >, <, >, the value for the corresponding line that already meets the formulated condition by the variable OP with <, >, <, > is assumed. For some of the control signals SCONT1, SCONT2, SCONT3, SCONT4, SCONT5, SCONT6, SCONT7, SCONT8, SCONT9 or SCONT10, the same priorities can be also be stipulated and the corresponding priority decided on as a function of situation or randomly.

It can be prescribed that individual PALC layers and/or individual SPD layers be segmented in the sense of individually controllable segments. Such segments can be used, for example, to display emblems, like the emblems 53 depicted in FIG. 4. For example, if, in the ninth line of all control signals SBIN1, SBIN5, SBIN6, SBIN7, SBIN8, SBIN9 and SBIN10 and/or all control signals SCONT1, SCONT2, SCONT3, SCONT4, SCONT5, SCONT6, SCONT7, SCONT8, SCONT9 and SCONT10 are occupied with "no information", it can be prescribed that the ninth line in the control signals SBIN and SCONT contain values to produce emblem 53.

The control 1 includes a calibration device 91 for automatic changing of a control signal SCONTRAW, produced by means of control 1 as a function of the output signal ALTRG of the transparency sensor 18, the control signal SCONTRAW and the control signal SBIN. The control signal SCONTRAW or a corresponding line of the control signal SCONTRAW is multiplied by a compensation factor corresponding to the age of a window pane 41, 44, 45, 46, 47, 51, 55, 56 or 57 and issued as control signal SCONT.

The control 1 also includes a safety device 92, optionally implemented on separate safety hardware and optionally with its own emergency power supply, which prevents the lower part 43 of the front window 41 from becoming opaque, if the speed v of the vehicle 40 does not equal zero. With this exception, the control signal SBIN corresponds to the control signal SBINRAW.

Figure 9:
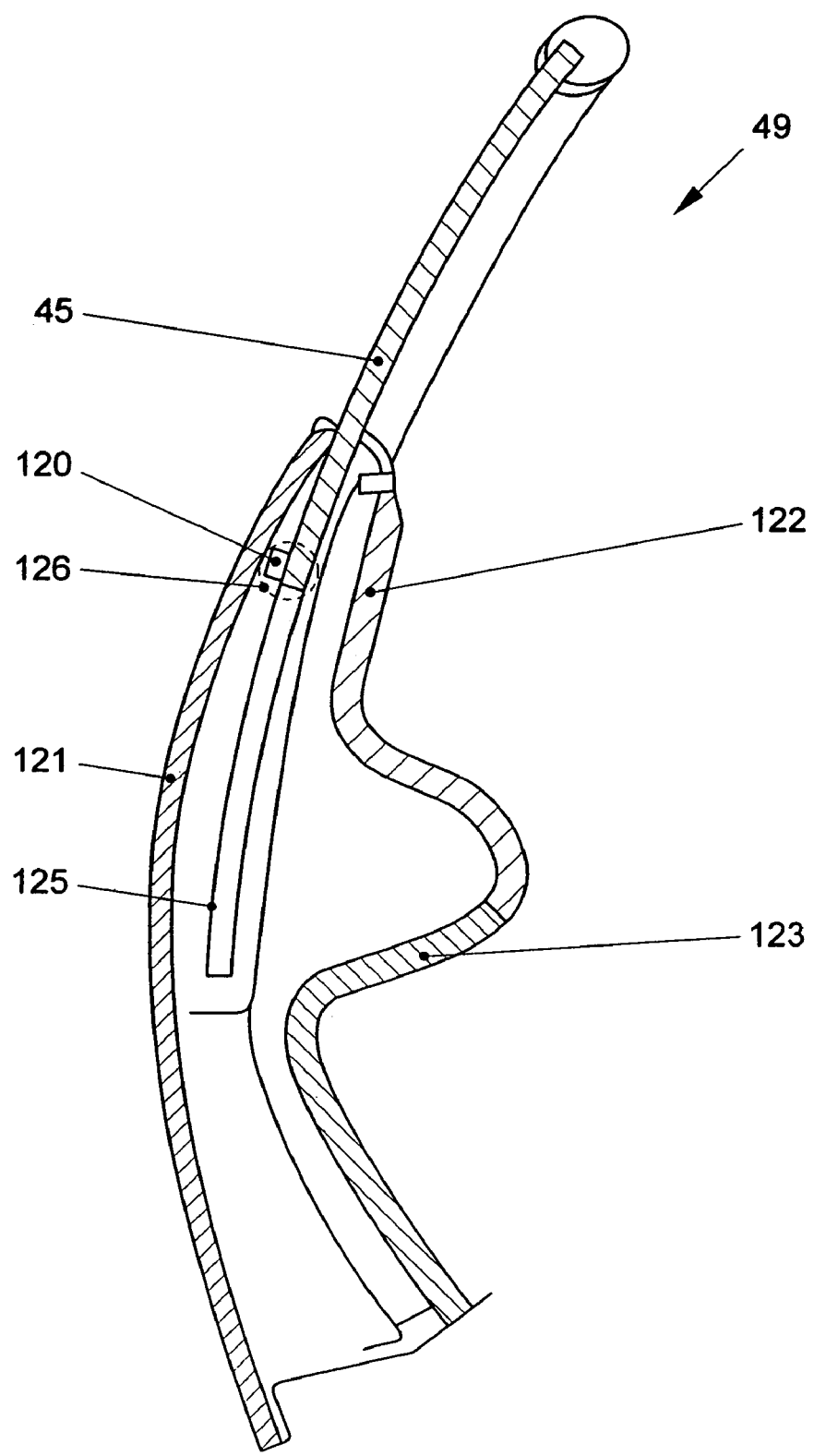
FIG. 9 shows a cross section of a door of a vehicle.
Figure 10:
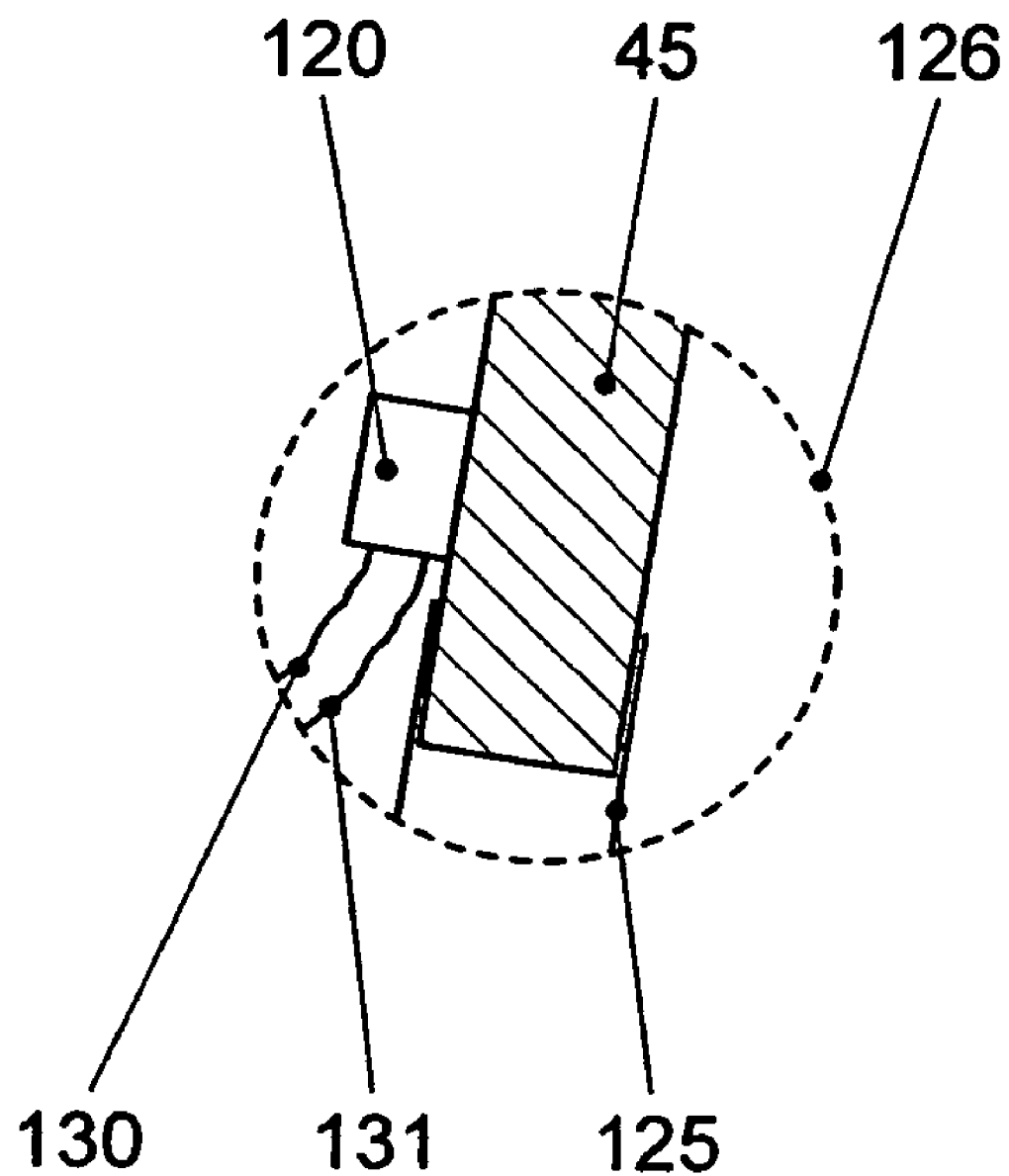
FIG. 10 shows an enlarged cutout of the cross section of the door according to FIG. 9.

FIG. 9 shows a cross section of 49 of vehicle 40 and FIG. 10 shows a section of the cross section of door 49, enlarged with a circle designated with reference 126 in FIG. 9. The door 49 has an outer panel, designated with reference number 121, and an inner panel, designated with reference numbers 123 and 123. Between the outer panel 121 and the inner panel 122 or 123, a guide 125 is arranged, in which the side window 45 can be moved up and down.

A voltage converter 120, connected mechanically (and electrically) to the side window 45, is arranged on side window 45 for transformation of the voltage of the control signal SBIN and/or SCONT that can be generated by control 1. The voltage converter 120 is connected for this purpose electrically to control 1 via feed lines 130 and 131 (not shown for reasons of clarity in FIG. 9). Appropriate voltage converters can be obtained, for example, from Endicott Research Group, Inc., 2601 Wayne St., Endicott N.Y. 13760, USA. A particularly suitable voltage converter is the LSP 12-3-14 H voltage converter of Endicott Research Group, Inc. The LSP 12-3-14 H voltage converter converts a 12 V DC voltage to a 120 V AC voltage. The voltage converter 120 is connected to the side window, so that it is arranged between the outer panel 121 and the inner panel 122, even with the side window 45 closed, i.e., moved up.

Such voltage converters can also be provided in the other window panes or part of the other window panes. In addition, it can be prescribed that each PALC or SPD layer has its own voltage converter connected to the corresponding window pane.

Figure 11:
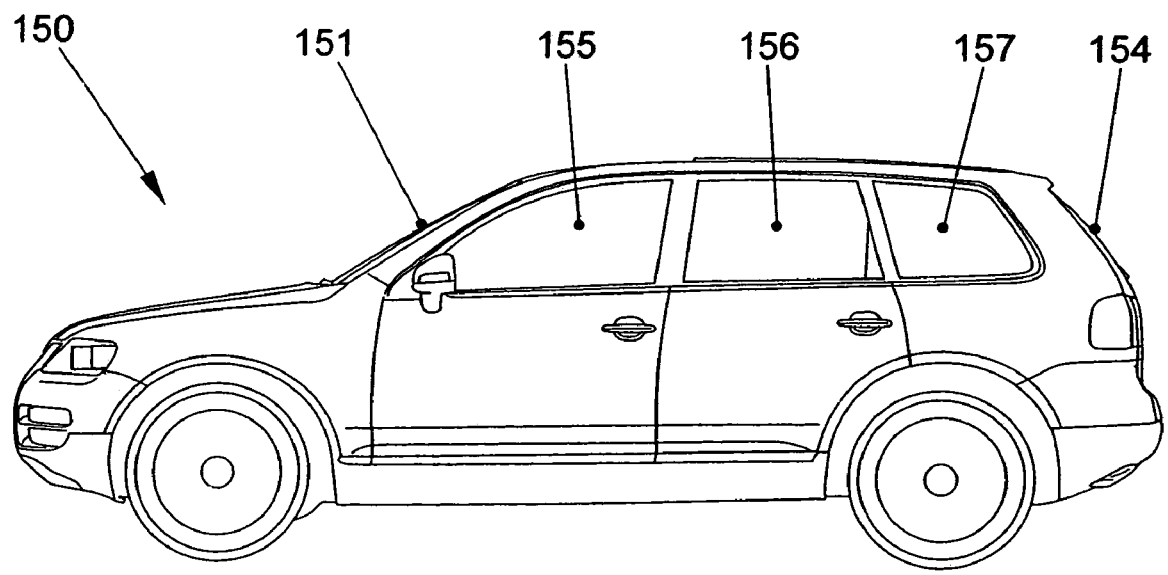
FIG. 11 shows a practical example of an armored vehicle in a side view.

FIG. 11 shows a practical example of an armored vehicle 150 in a side view. The armored vehicle 150 has bullet-proof window panes 151, 154, 155, 156, 157 to cover an internal space of the armored vehicle 150, in which transparency of the bullet-proof back window 154 and the rear bullet-proof side windows 156 and 157 is adjustable. The bullet-proof rear window 154 and the rear bullet-proof side windows 156 and 157 of the armored vehicle 150 are set in the direction of lowest transparency, especially opaque, when a control 161 recognizes a vibration, further explained with reference to FIG. 12, that would be suitable to destroy an ordinary window pane of a vehicle. Such a vibration, for example, can be the striking of a bullet or a heavy blow.

Figure 12:
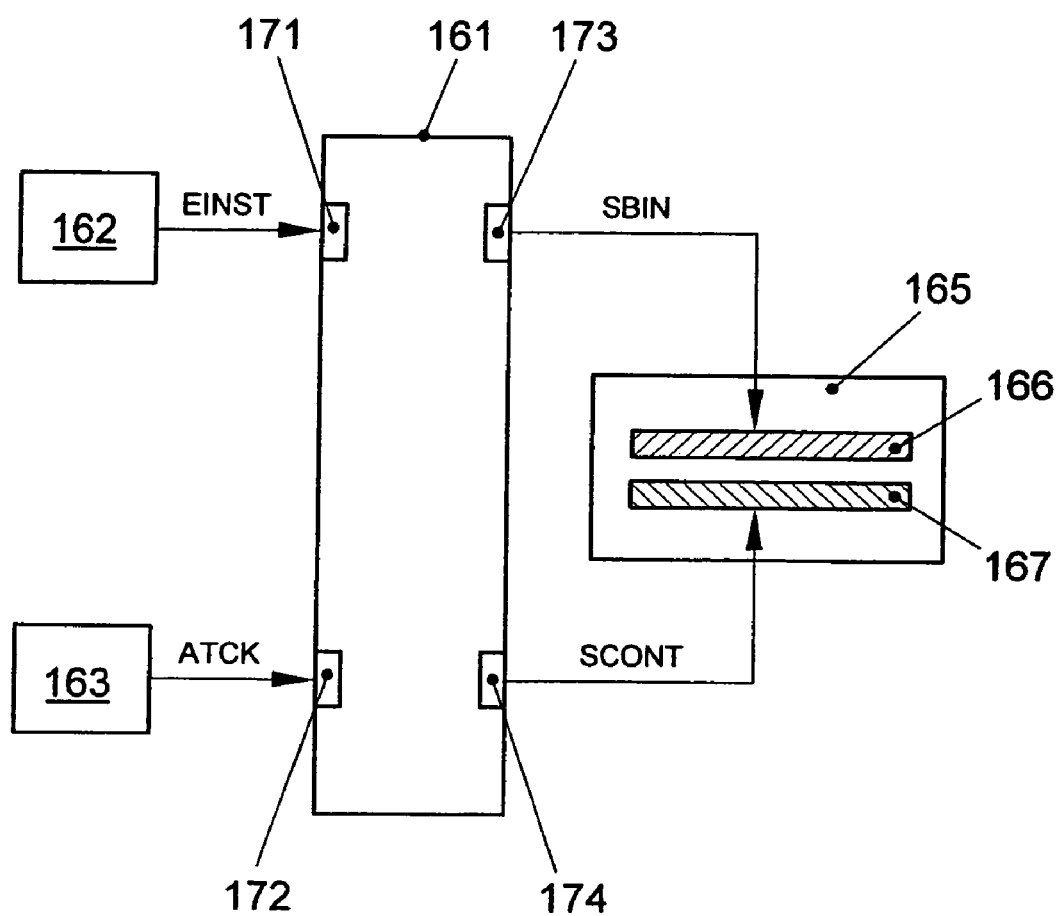
FIG. 12 shows a practical example of a control for automatic adjustment of transparency of a window pane of an armored vehicle.

FIG. 12 shows a practical example of the control 161 for automatic adjustment of transparency of a window pane 165, which can be the practical example of a bullet-proof rear window 154 and/or the rear bullet-proof side windows 156 and/or 157. The window pane 165 can be a PALC layer 166 corresponding to the PALC layer 16 and/or an SPD layer 167 corresponding to the SPD layer 17, which are controllable by control signals SBIN and SCONT that can be produced via interfaces 173 and 174.

The armored vehicle 150 has an input device 162 for manual adjustment of the transparency of the window pane 165 by means of a signal EINST, which can be read by control 161 via an interface 171. The control 161 generates the control signals SBIN and SCONT according to the signal EINST.

The armored vehicle 150 also has a vibration sensor 163 to record a vibration acting on the armored vehicle 150 and/or the bullet-proof window pane 165 and to produce a signal ATCK, indicating such high vibration, which can be read by the control 161 via an interface 172. If the signal ATCK indicates such a vibration, the control 161 generates the control signals SBIN and SCONT, so that the window pane 165 assumes its lowest transparency.

The armored vehicle 150 can include a voltage conferred or corresponding to the voltage converter 120.

The elements and layers in the figures are not necessarily drawn true to scale, in the interest of simplicity and clarity. For example, the orders of magnitude of some elements or layers are exaggerated relative to other elements or layers, in order to improve understanding of the practical examples of the present invention.

LIST OF REFERENCE NUMBERS

| | |
|---|---|
| 1, 14, 161 | Control |
| 2, 162 | Input device |
| 3 | Transmission |
| 4 | Transmission control |
| 5 | Small child recognition |
| 6 | Database |
| 7 | Person recognition |
| 8 | Sensor to recognize an accident |
| 9 | Navigation system |
| 10 | Database |
| 11 | Satellite |
| 13 | Door lock |

-continued

| | |
|---|---|
| 15, 60, 165 | Window pane |
| 16, 63, 166 | PALC layer |
| 17, 65, 167 | SPD layer |
| 18 | Transparency sensor |
| 19 | LED |
| 20 | Photodiode |
| 21 | Air conditioner |
| 22 | Fog lamp |
| 23 | Light sensor |
| 24 | Rain sensor |
| 25 | Sunlight sensor |
| 30 | Key |
| 40 | Vehicle |
| 41, 151 | Front window |
| 42 | Upper part of a front window |
| 43 | Lower part of a front window |
| 44, 154 | Rear window |
| 45, 46, 47, 55, 56, 57, 155, 156, 157 | Side windows |
| 49, 59 | Door |
| 51 | Roof window |
| 53 | Emblem |
| 61, 67 | Glass layer |
| 62, 66 | PVB layer |
| 64 | Layer of PVB or PU |
| 71, 73, 75, 77 | Electrode |
| 72 | PALC film |
| 76 | SPD film |
| 80 | Location module |
| 81 | Rain module |
| 82 | Outside light module |
| 83 | Fog module |
| 84 | Temperature management module |
| 85 | Closure module |
| 86 | Reverse module |
| 87 | Accident module |
| 88 | Preadjustment module |
| 89 | Solar radiation module |
| 90 | Conflict management module |
| 91 | Calibration device |
| 92 | Safety device |
| 101, 102, 103, 104, 105, 106, 107, 108, 109, 110, 111, 112, 113, 114, 115, 116, 117, 171, 172, 173, 174 | Interface |
| 120 | Voltage converter |
| 121 | Outer panel |
| 122, 123 | Inner panel |
| 125 | Guide |
| 126 | Circle |
| 130, 131 | Feed line |
| 150 | Armored vehicle |
| 163 | Vibration sensor |
| ALTRG, HLGK, CRASH, RGN ATCK, BABY, CLIMA, EINST, LOCK, RGANG, SON | Output signal |
| | Signal |
| GEO | Geographic location |
| LAW | Information concerning prevailing legal provisions |
| NBL | Switching state of a fog lamp |
| SBIN, SBINRAW, SBIN1, SBIN5, SBIN6, SBIN7, SBIN8, SBIN9, SBIN10, SCONT, SCONTRAW, SCONT1, SCONT2, SCONT3, SCONT4, SCONT5, SCONT6, SCONT7, SCONT8, SCONT9, SCONT10 | Control signal |
| v | Speed |
| VOREIN | Information on preadjustment of window panes |

What we claim is:

1. A vehicle comprising:
a window pane to cover an inter space of the vehicle, wherein transparency of the window pane is adjustable, wherein the window pane comprises a plasma addressed liquid crystal (PALC) layer and a suspended particle device (SPD) layer arranged on the PALC layer; and
a control for automatic adjustment of the transparency of the window pane as a function of a vehicle operating state.

2. A vehicle according to claim 1, wherein the operating state comprises solar radiation acting on the window pane.

3. A vehicle according to claim 2, wherein the control comprises a solar radiation module to produce a control signal to adjust the transparency of the window pane as a function of an output signal of a sensor measuring the solar radiation acting on the window pane.

4. A vehicle according to claim 1, wherein the operating state comprises an output signal of a rain sensor to measure rain acting on the vehicle.

5. A vehicle according to claim 4, wherein the control comprises a rain module to generate a control signal to adjust the transparency of the window pane as a function of the output signal of the rain sensor.

6. A vehicle according to claim 1, wherein the operating state comprises an amount of light present outside of the vehicle.

7. A vehicle according to claim 6, wherein the control comprises an outside light module to generate a control signal to adjust the transparency of the window pane as a function of an output signal of the light sensor to measure the amount of light present outside of the vehicle.

8. A vehicle according to claim 1, wherein the operating state comprises a switching state of a fog lamp.

9. A vehicle according to claim 8, wherein the control comprises a fog module to generate a control signal to adjust the transparency of a window pane as a function of the switching state of the fog lamp.

10. A vehicle according to claim 1, wherein the operating state comprises a state of an air conditioner.

11. A vehicle according to claim 10, wherein the control comprises a temperature management module to generate a control signal to adjust the transparency of the window pane as a function of the state of the air conditioner.

12. A vehicle according to claim 1, wherein the operating state comprises a state of a door lock.

13. A vehicle according to claim 12, wherein the control comprises a closure module to generate a control signal to adjust the transparency of the window pane as a function of the door lock.

14. A vehicle according to claim 1, wherein the operating state comprises an engaged gear of a transmission.

15. A vehicle according to claim 14, wherein the control comprises a reverse module to generate a control signal to adjust the transparency of the window pane as a function of whether a reverse gear is engaged.

16. A vehicle according to claim 15, wherein the window pane is a rear window.

17. A vehicle according to claim 1, wherein the operating state comprises the presence of an accident.

18. A vehicle according to claim 17, wherein the control comprises an accident management module to generate a control signal to adjust the highest transparency of the window pane during recognition of an accident.

19. A vehicle according to claim 1, wherein the operating state comprises a geographic location of the vehicle.

20. A vehicle according to claim 19, wherein the control comprises a location module to generate a control signal to adjust the transparency of the window pane as a function of the legal provisions prevailing at the geographic location of the vehicle.

21. A vehicle according to claim 1, wherein the operating state comprises an occupancy of the internal space of the vehicle.

22. A vehicle according to claim 1, wherein the control comprises an occupation module to generate a control signal to adjust the transparency of the window pane as a function of the occupancy of the internal space of the vehicle.

23. A vehicle according to claim 1, wherein the control comprises a conflict management module to generate a control signal to adjust the transparency of the window pane as a function of at least two operating states.

24. A vehicle according to claim 1, wherein the control comprises:
a conflict management module to generate a control signal to adjust the transparency of the window pane as a function of a first control signal to adjust the transparency of a window pane as a function of the first operating state; and
at least one second control signal to adjust the transparency of the window pane as a function of a second operating state.

25. A vehicle according to claim 1, wherein a PVB layer or PU layer is arranged between the PALC layer and the SPD layer.

26. A vehicle according to claim 1, wherein a PVB layer is arranged on the side of the SPD layer facing away from the PALC layer.

27. A vehicle according to claim 1, wherein a PVB layer is arranged on the side of the PALC layer facing away from the SPD layer.

28. A vehicle according to claim 1, wherein the window pane is a front window.

29. A vehicle according to claim 1, wherein the window pane is a rear window.

30. A vehicle according to claim 1, wherein the window pane is a side window.

31. A vehicle according to claim 1, wherein the window pane is a roof window.

32. A vehicle according to claim 1, further comprising:
a transparency sensor to measure the transparency of the window pane, and
a calibration device for automatically changing a control signal generated by the control as a function of an output signal of the transparency sensor.

33. A vehicle according to claim 1, further comprising a voltage converter to convert the voltage of a control signal that can be generated by the control to adjust the transparency of the window pane.

34. A vehicle according to claim 33, wherein the voltage converter is mechanically connected to the window pane.

35. A vehicle according to claim 34, wherein the window pane can be moved up and down.

36. A vehicle comprising:
a window pane for covering of an internal space of the vehicle, wherein transparency of the window pane is adjustable as a function of a control signal, wherein the window pane comprises a plasma addressed liquid crystal (PALC) layer and a suspended particle device (SPD) layer arranged on the PALC layer;
a control to generate the control signal;
a transparency sensor to measure the transparency of the window pane; and
a calibration device for automatically changing the control signal as a function of an output signal of the transparency sensor.

37. A vehicle according to claim 36, wherein the PVB layer or PU layer is arranged between the PALC layer and the SPD layer.

38. A vehicle according to claim 36, wherein the PVB layer is arranged on the side of the SPD layer facing away from the PALC layer.

39. A vehicle according to claim 36, wherein the PVB layer is arranged on the side of the PALC layer facing away from the SPD layer.

40. A vehicle according to claim 36, further comprising a voltage converter to convert the voltage of the control signal.

41. A vehicle according to claim 40, wherein the voltage converter is mechanically connected to the window pane.

42. A vehicle according to claim 41, wherein the window pane can be moved up and down.

43. An armored vehicle comprising:
a bullet-proof window pane for covering of an internal space of the armored vehicle, wherein transparency of the bullet-proof window pane is adjustable and wherein the window pane comprises a plasma addressed liquid crystal (PALC) layer and a suspended particle device (SPD) layer arranged on the PALC layer;
a vibration sensor to record a vibration acting on the armored vehicle or bullet-proof window pane; and
a control for automatic adjustment of the transparency of the bullet-proof window pane as a function of an output signal of the vibration sensor.

44. An armored vehicle according to claim 43, wherein the bullet-proof window pane is a bullet-proof rear window.

45. An armored vehicle according to claim 43, wherein the bullet-proof window pane is a bullet-proof side window.

46. An armored vehicle according to claim 43, wherein the PVB layer or PU layer is arranged between the PALC layer and the SPD layer.

47. An armored vehicle according to claim 43, wherein a PVB layer is arranged on the side of an SPD layer facing away from the PALC layer.

48. An armored vehicle according to claim 43, wherein a PVB layer is arranged on the side of the PALC layer facing away from the SPD layer.

49. A vehicle comprising:
a window pane for covering an internal space of a vehicle, wherein transparency of the window pane is adjustable, said window pane comprising:
a plasma addressed liquid crystal (PALC) layer; and
an suspended particle device (SPD) layer arranged on the PALC layer.

50. A vehicle according to claim 49, wherein a PVB layer or PU layer is arranged between the PALC layer and the SPD layer.

51. A vehicle according to claim 49, wherein a PVB layer is arranged on the side of the SPD layer facing away from the PALC layer.

52. A vehicle according to claim 49, wherein the PVB layer is arranged on the side of the PALC layer facing away from the SPD layer.

53. A vehicle according to claim 49, further comprising a voltage converter to convert the voltage of a control signal for adjustment of the PALC layer.

54. A vehicle according to claim 53, wherein the voltage converter is mechanically connected to the window pane.

55. A vehicle according to claim 54, wherein the window pane can be moved up and down.

56. A vehicle according to claim 49, further comprising a voltage converter to convert the voltage of a control signal for adjustment of the SPD layer.

57. A vehicle according to claim 56, wherein the voltage converter is mechanically connected to the window pane.

58. A vehicle according to claim 57, wherein the window pane can be moved up and down.

59. A vehicle comprising:
- a window pane to cover the internal space of a vehicle, wherein the transparency of the window pane is adjustable, wherein the window pane comprises a plasma addressed liquid crystal (PALC) layer and a suspended particle device (SPD) layer arranged on the PALC layer; and
- a voltage converter mechanically connected to the window pane for conversion of the voltage of a control signal for adjustment of the transparency of the window pane.

60. A vehicle according to claim 59, wherein the window pane can be moved up and down.

61. A window pane according to claim 59, wherein a PVB layer or PU layer is arranged between the PALC layer and the SPD layer.

62. A window pane according to claim 59, wherein the PVB layer is arranged on the side of the SPD layer facing away from the PALC layer.

63. A window pane according to claim 59, wherein the PVB layer is arranged on the side of the PALC layer facing away from the SPD layer.

64. A vehicle comprising:
- a window pane to cover an inter space of the vehicle, wherein transparency of the window pane is adjustable; and
- a control for automatic adjustment of the transparency of the window pane as a function of a vehicle operating state, wherein the operating state comprises a geographic location of the vehicle and wherein the control comprises a location module to generate a control signal to adjust the transparency of the window pane as a function of legal provisions prevailing at the geographic location of the vehicle.

* * * * *